United States Patent
Dadashikelayeh et al.

(10) Patent No.: US 10,152,358 B2
(45) Date of Patent: *Dec. 11, 2018

(54) METHODS AND SYSTEMS FOR QUANTUM READY AND QUANTUM ENABLED COMPUTATIONS

(71) Applicant: 1QB Information Technologies Inc., Vancouver (CA)

(72) Inventors: Majid Dadashikelayeh, Vancouver (CA); Arman Zaribafiyan, Vancouver (CA)

(73) Assignee: 1QB INFORMATION TECHNOLOGIES INC., Vancouver, BC (CA)

(*) Notice: Subject to any disclaimer, the term of this patent is extended or adjusted under 35 U.S.C. 154(b) by 0 days.

This patent is subject to a terminal disclaimer.

(21) Appl. No.: 15/831,967

(22) Filed: Dec. 5, 2017

(65) Prior Publication Data

US 2018/0107526 A1    Apr. 19, 2018

Related U.S. Application Data

(60) Division of application No. 15/486,960, filed on Apr. 13, 2017, now Pat. No. 9,870,273, which is a
(Continued)

(51) Int. Cl.
*G06F 9/50* (2006.01)
*G06F 21/44* (2013.01)
(Continued)

(52) U.S. Cl.
CPC .......... *G06F 9/5083* (2013.01); *G06F 9/4806* (2013.01); *G06F 9/54* (2013.01);
(Continued)

(58) Field of Classification Search
CPC .......... G06F 17/10; G06F 9/54; G06F 9/5083; G06F 13/107; G06F 17/5009;
(Continued)

(56) References Cited

U.S. PATENT DOCUMENTS

| 7,113,967 B2 | 9/2006 | Cleve et al. |
| 7,135,701 B2 | 11/2006 | Amin et al. |

(Continued)

FOREIGN PATENT DOCUMENTS

| CA | 2840958 A1 | 1/2013 |
| CA | 2881033 A1 | 4/2015 |

(Continued)

OTHER PUBLICATIONS

Anthony et al. Quadratization of symmetric pseudo-Boolean functions. Discrete Appl. Math. 203:1-12 (2016).
(Continued)

*Primary Examiner* — Sargon N Nano
(74) *Attorney, Agent, or Firm* — Wilson Sonsini Goodrich & Rosati

(57) ABSTRACT

The present disclosure provides methods, systems, and media for allowing access to quantum ready and/or quantum enabled computers in a distributed computing environment (e.g., the cloud). Such methods and systems may provide optimization and computational services on the cloud. Methods and systems of the present disclosure may enable quantum computing to be relatively and readily scaled across various types of quantum computers and users at various locations, in some cases without the need for users to have a deep understanding of the resources, implementation or the knowledge that may be required for solving optimization problems using a quantum computer. Systems provided herein may include user interfaces that enable users to perform data analysis in a distributed computing (Continued)

environment while taking advantage of quantum technology in the backend.

22 Claims, 7 Drawing Sheets

Related U.S. Application Data continuation-in-part of application No. 15/349,519, filed on Nov. 11, 2016, now Pat. No. 9,660,859, which is a continuation of application No. 15/181,247, filed on Jun. 13, 2016, now Pat. No. 9,537,953.

(60) Provisional application No. 62/436,093, filed on Dec. 19, 2016.

(51) Int. Cl.

| | | |
|---|---|---|
| *G06N 3/00* | (2006.01) | |
| *G06N 99/00* | (2010.01) | |
| *H04L 12/24* | (2006.01) | |
| *H04L 29/08* | (2006.01) | |
| *G06F 9/48* | (2006.01) | |
| *G06F 9/54* | (2006.01) | |
| *G06F 17/30* | (2006.01) | |
| *H04L 29/06* | (2006.01) | |

(52) U.S. Cl.
CPC .. *G06F 17/30557* (2013.01); *G06F 17/30864* (2013.01); *G06F 21/44* (2013.01); *G06N 3/006* (2013.01); *G06N 99/002* (2013.01); *H04L 41/046* (2013.01); *H04L 63/20* (2013.01); *H04L 67/2823* (2013.01); *H04L 63/08* (2013.01); *H04L 67/10* (2013.01)

(58) Field of Classification Search
CPC . G06F 17/30; G06F 7/38; H04L 12/26; H04L 12/19; H04L 67/10; H04L 67/22; H04L 29/08; G06J 1/00
See application file for complete search history.

(56) References Cited

U.S. PATENT DOCUMENTS

| | | | |
|---|---|---|---|
| 7,234,144 B2 * | 6/2007 | Wilt | G06F 9/3851 710/52 |
| 7,418,283 B2 | 8/2008 | Amin et al. | |
| 7,533,068 B2 | 5/2009 | Maassen et al. | |
| 7,619,437 B2 | 11/2009 | Thom et al. | |
| 7,639,035 B2 | 12/2009 | Berkley | |
| 7,660,533 B1 | 2/2010 | Meyers et al. | |
| 7,898,282 B2 | 3/2011 | Harris et al. | |
| 7,984,012 B2 | 7/2011 | Coury et al. | |
| 8,008,942 B2 | 8/2011 | Van et al. | |
| 8,126,649 B2 | 2/2012 | Frasch et al. | |
| 8,195,596 B2 | 6/2012 | Rose et al. | |
| 8,195,726 B2 * | 6/2012 | Macready | B82Y 10/00 708/1 |
| 8,219,605 B2 | 7/2012 | Cowlishaw et al. | |
| 8,230,432 B2 | 7/2012 | Bryant et al. | |
| 8,244,662 B2 | 8/2012 | Coury et al. | |
| 8,283,943 B2 | 10/2012 | Van et al. | |
| 8,421,053 B2 | 4/2013 | Bunyk et al. | |
| 8,503,885 B2 | 8/2013 | Meyers et al. | |
| 8,655,828 B2 | 2/2014 | Rose | |
| 9,537,953 B1 | 1/2017 | Dadashikelayeh et al. | |
| 9,660,859 B1 | 5/2017 | Dadashikelayeh et al. | |
| 9,727,824 B2 | 8/2017 | Rose et al. | |
| 9,870,273 B2 | 1/2018 | Dadashikelayeh et al. | |
| 9,881,256 B2 | 1/2018 | Hamze et al. | |
| 2003/0005068 A1 | 1/2003 | Nickel et al. | |
| 2003/0121028 A1 | 6/2003 | Coury et al. | |
| 2004/0267916 A1 | 12/2004 | Chambliss et al. | |
| 2005/0273306 A1 * | 12/2005 | Hilton | B82Y 10/00 703/11 |
| 2006/0221978 A1 | 10/2006 | Venkatachalam | |
| 2006/0225165 A1 | 10/2006 | Maassen et al. | |
| 2007/0239366 A1 | 10/2007 | Hilton et al. | |
| 2008/0186918 A1 | 8/2008 | Tinnakornsrisuphap et al. | |
| 2008/0218519 A1 | 9/2008 | Coury et al. | |
| 2008/0262990 A1 | 10/2008 | Kapoor et al. | |
| 2008/0313430 A1 * | 12/2008 | Bunyk | B82Y 10/00 712/34 |
| 2009/0078932 A1 | 3/2009 | Amin | |
| 2009/0164435 A1 * | 6/2009 | Routt | B82Y 10/00 |
| 2009/0325694 A1 | 12/2009 | Beckman et al. | |
| 2010/0261481 A1 | 10/2010 | Resende et al. | |
| 2011/0238855 A1 | 9/2011 | Korsunsky et al. | |
| 2011/0296229 A1 | 12/2011 | Cowlishaw et al. | |
| 2012/0072579 A1 * | 3/2012 | Teather | H04L 41/5009 709/224 |
| 2012/0240185 A1 | 9/2012 | Kapoor et al. | |
| 2012/0278374 A1 | 11/2012 | Cowlishaw et al. | |
| 2012/0326720 A1 | 12/2012 | Gambetta et al. | |
| 2013/0144925 A1 | 6/2013 | Macready et al. | |
| 2013/0263131 A1 * | 10/2013 | Beda, III | G06F 8/63 718/1 |
| 2013/0308956 A1 | 11/2013 | Meyers et al. | |
| 2013/0336472 A1 * | 12/2013 | Fahlgren | H04M 3/523 379/266.01 |
| 2014/0025606 A1 | 1/2014 | Macready | |
| 2014/0122702 A1 | 5/2014 | Jung et al. | |
| 2014/0123325 A1 | 5/2014 | Jung et al. | |
| 2014/0187427 A1 | 7/2014 | Macready et al. | |
| 2014/0214257 A1 | 7/2014 | Williams et al. | |
| 2014/0258730 A1 | 9/2014 | Stecher | |
| 2014/0337612 A1 | 11/2014 | Williams et al. | |
| 2014/0379924 A1 | 12/2014 | Das et al. | |
| 2015/0055961 A1 | 2/2015 | Meyers et al. | |
| 2015/0120551 A1 | 4/2015 | Jung et al. | |
| 2015/0120555 A1 | 4/2015 | Jung et al. | |
| 2015/0169746 A1 | 6/2015 | Hatami-Hanza | |
| 2015/0178349 A1 | 6/2015 | Niewodniczanski et al. | |
| 2015/0193692 A1 | 7/2015 | Israel | |
| 2015/0220852 A1 | 8/2015 | Hatami-Hanza | |
| 2015/0227559 A1 | 8/2015 | Hatami-Hanza | |
| 2015/0349960 A1 | 12/2015 | Bagley | |
| 2015/0358251 A1 | 12/2015 | Varga et al. | |
| 2016/0071021 A1 * | 3/2016 | Raymond | G06N 99/002 712/28 |
| 2016/0171368 A1 | 6/2016 | Aspuru-Guzik et al. | |
| 2016/0224515 A1 * | 8/2016 | Ronagh | G06F 17/11 |
| 2016/0321559 A1 * | 11/2016 | Rose | G06N 99/005 |
| 2016/0328253 A1 | 11/2016 | Majumdar | |
| 2017/0011305 A1 | 1/2017 | Williams | |
| 2017/0060642 A1 * | 3/2017 | Castellano | G06F 9/5077 |
| 2017/0147303 A1 | 5/2017 | Amy et al. | |
| 2017/0147695 A1 * | 5/2017 | Shih | G06F 17/30867 |
| 2017/0223143 A1 * | 8/2017 | Johnson | H04L 67/40 |
| 2017/0242824 A1 * | 8/2017 | Karimi | G06F 17/11 |
| 2017/0255592 A1 | 9/2017 | Karimi et al. | |
| 2017/0255872 A1 * | 9/2017 | Hamze | G06N 99/002 |
| 2017/0286852 A1 | 10/2017 | Rezaie et al. | |
| 2017/0286858 A1 * | 10/2017 | La Cour | G06N 99/002 |
| 2017/0344898 A1 | 11/2017 | Karimi et al. | |
| 2017/0351974 A1 * | 12/2017 | Rose | G06K 9/6249 |

FOREIGN PATENT DOCUMENTS

| | | |
|---|---|---|
| CA | 2921711 A1 | 8/2017 |
| WO | WO-2007089674 A2 | 8/2007 |
| WO | WO-2010148120 A2 | 12/2010 |
| WO | WO-2014210368 A1 | 12/2014 |
| WO | WO-2015060915 A2 | 4/2015 |
| WO | WO-2015121619 A2 | 8/2015 |
| WO | WO-2017145086 A1 | 8/2017 |
| WO | WO-2017149491 A1 | 9/2017 |
| WO | WO-2017152289 A1 | 9/2017 |

(56) References Cited

FOREIGN PATENT DOCUMENTS

| WO | WO-2017201626 A1 | 11/2017 |
| WO | WO-2017214717 A1 | 12/2017 |

OTHER PUBLICATIONS

Babbush et al. Resource Efficient Gadgets for Compiling Adiabatic Quantum Optimization Problems. arXiv:1307.8041v1 [quant-ph] (pp. 1-11) (Jul. 2013) Retrieved from the Internet:<https://arxiv.org/pdf/1307.8041.pdf5.
Cai et al. A practical heuristic for finding graph minors.arXiv:1406.2741 [quant-ph] (16 pgs) (2014).
Co-pending U.S. Appl. No. 15/830,953, filed Dec. 4, 2017.
Farhi et al. Quantum Adiabatic Evolution Algorithms versus Simulated Annealing.arXiv.org:quant ph /0201031 pp. 1-16 (2002).
Farhi et al. Quantum computation by adiabatic evolution. arXiv preprint quant-ph/0001106 (24 pgs) (2000).
Grover. A fast quantum mechanical algorithm for database search. Proceedings of the 28th Annual ACM Symposium on the Theory of Computing (pp. 212-219) (1996).
Ishikawa. Transformation of General Binary MRF Minimization to the First-Order Case. IEEE Transactions on Pattern Analysis and Machine Intelligence. 33(6):1234-1249 (2011).
Karimi et al. A subgradient approach for constrained binary programming via quantum adiabatic evolution. arXiv preprint arXiv:1605.09462 (16 pgs.) (2016).
Katzgraber et al. Seeking quantum speedup through spin glasses: the good, the bad, and the ugly. Physical Review 5(3):031026 (2015).
Martinis et al. Rabi oscillations in a large Josephson-junction qubit. Physical Review Letters 89:117901 (2002).
McGeoch et al. Experimental Evaluation of an Adiabatic Quantum System for Combinatorial Optimization. Computing Frontiers. Proceeding CF '13 Proceedings of the ACM International Conference on Computing Frontiers. Article No. 23. Available athttp://www.cs.amherst.edu/ccm/cf14-mcgeoch.pdf (11 pgs) (May 14-16, 2013).
Metz. IBM Is Now Letting Anyone Play With Its Quantum Computer. Wired. (5 pgs.) (May 2016).
O'Gorman et al. Compiling planning into quantum optimization problems: a comparative study. Proc. of the Workshop on Constraint Satisfaction Techniques for Planning and Scheduling Problems (COPLAS-15) (pp. 11-20) (Jun. 2015) Retrieved from the Internet<https://www.cs.bgu.acilt--icaps15/workshops/Proceedings%2000PLAS%20202015.pdf>.
PCT/CA2017/050320 International Search Report and Written Opinion dated Jun. 27, 2017.
PCT/CA2017/050637 International Search Report and Written Opinion dated Aug. 25, 2017.
PCT/CA2017/050709 International Search Report and Written Opinion dated Sep. 19, 2017.
Ronagh et al. Solving constrained quadratic binary problems via quantum adiabatic evolution. arXiv preprint arXiv:1509.05001 (20 pgs.) (2015).
SymPy Python. Internals of the Polynomial Manupulation Module. Available online at http://docs.sympy.org/latest/modules/polys/internals.html (Accessed Jun. 2016) (136 pgs).
The D-Wave 2X™ Quantum Compute Technology Overview (12 pgs) (2015).
U.S. Appl. No. 15/165,655 1st Action Interview dated Feb. 24, 2017.
U.S. Appl. No. 15/165,655 1st Action Interview dated Oct. 25, 2016.
U.S. Appl. No. 15/165,655 Office Action dated Jun. 2, 2017.
U.S. Appl. No. 15/486,960 Office Action dated Jun. 22, 2017.
Van Dam et al. How powerful is adiabatic quantum computation Proceedings 42nd IEEE Symposium on Foundations of Computer Science (pp. 279-287) (Oct. 2001).
Berry et al. Simulating Hamiltonian dynamics with a truncated Taylor series. Phys Rev Lett 114(9):090502 (2015).
Bian et al. The Ising model: teaching an old problem new tricks. D-Wave Systems 2 (32 pgs.) (2010).
Boros et al. On quadratization of pseudo-Boolean functions. arXiv:1404.6538v1 [math.OC] (11 pgs.) (2014).
Boros et al. Pseudo-boolean optimization. Discrete Applied Mathematics 123(1):155-225 (2002).
Co-pending U.S. Appl. No. 15/900,643, filed Feb. 20, 2018.
Montanaro. Quantum walk speedup of backtracking algorithms. arXiv:1509.02374v2 [quant-ph] (23 pgs) (2015).
Suzuki. Fractal decomposition of exponential operators with applications to many-body theories and Monte Carlo simulations. Physics Letters A 146(6):319-323 (1990).
Tran et al. A hybrid quantum-classical approach to solving scheduling problems. AAAI Publications, Ninth Annual Symposium on Combinatorial Search. pp. 98-106 (SoCS 2016).
Trotter. On the product of semi-groups of operators. Proceedings of the American Mathematical Society 10(4):545-551 (1959).
U.S. Appl. No. 15/830,953 Office Action dated Feb. 14, 2018.
PCT/CA2017/051610 International Search Report and Written Opinion dated Mar. 21, 2018.
Tavares et al. New algorithms for Quadratic Unconstrained Binary Optimization (QUBO) with applications in engineering and social sciences. Rutgers University Community Repository. Dissertation—Retrieved from the Internet< URL: https://rucorelibrariessutgers.edu/rutgers-lib/25771/> on Feb. 2, 2018 (460 pgs) ( May 2008).
Alidaee et al. Solving the maximum edge weight clique problem via unconstrained quadratic programming. European Journal of Operational Research 181(2):592-597 (2007).
Assad et al. The quadratic minimum spanning tree problem. Naval Research Logistics 39:399-417(1992).
Beasley. Integer programming solution methods. Available at URL: http://people.brunel.ac.uk/-mastjjb/jeb/natcor_ip_rest.pdf (20 pgs.) (2011).
Choi. Minor-embedding in adiabatic quantum computation: I. The parameter setting problem. Quantum Information Processing 7(5):193-209 (2008).
Freund. Applied Lagrange Duality for Constrained Optimization. Massachusetts Institute of Technology (pp. 1-35) (2004).
Geoffrion. Lagrangean relaxation for integer programming. Mathematics Programming Study 2, North-Holland Publishing Company (pp. 1-34) (1974).
Karimi et al. Boosting quantum annealer performance via quantum persistence. Online publication eprint arXiv:1606.07797 (Jun. 27, 1927 and updated Aug. 30, 2016). Accessed May 17, 2017 and available from https://www.arxiv.org/pdf/1606.07797.pdf (25 pgs).
Leyffer. Deterministic Methods for Mixed Integer Nonlinear Programming. University of Dundee (pp. 1-60 and pp. 1-58) (1993).
Li et al. Nonlinear Integer Programming. New York, NY (pp. 1-452) (2006).
PCT/IB2017/051038 International Search Report dated May 16, 2017.
PCT/IB2017/051224 International Search Report dated May 18, 2017.
Kellerer et al. Knapsack Problems. Springer (15 pgs.) (2004).
Rosenberg et al. Building an iterative heuristic solver for a quantum annealer. Computational Optimization and Applications 65:845 (2016).
Shapiro et al. A survey of Lagrangean techniques for discrete optimization. Operations Research Center, Massachusetts Institute of Technology, Cambridge, Massachusetts (pp. 1-18 and pp. 1-29) (May 1977).
U.S. Appl. No. 15/014,576 Office Action dated Dec. 26, 2017.
U.S. Appl. No. 15/014,576 Office Action dated Jul. 10, 2017.
U.S. Appl. No. 15/051,271 Office Action dated Mar. 13, 2018.
U.S. Appl. No. 15/051,271 Office Action dated Nov. 24, 2017.
Vinci et al. Quantum annealing correction with minor embedding. Physical Review A 92.4 (34 pgs) (Jul. 2015).

* cited by examiner

METHODS AND SYSTEMS FOR QUANTUM READY AND QUANTUM ENABLED COMPUTATIONS

CROSS-REFERENCE

This application is a division of U.S. patent application Ser. No. 15/486,960, filed Apr. 13, 2017, which is a continuation-in-part of U.S. patent application Ser. No. 15/349,519, filed Nov. 11, 2016, now U.S. Pat. No. 9,660,859, which is a continuation of U.S. patent application Ser. No. 15/181,247, filed Jun. 13, 2016, now U.S. Pat. No. 9,537,953; U.S. patent application Ser. No. 15/486,960 also claims priority to U.S. Provisional Patent Application No. 62/436,093, filed Dec. 19, 2016, each of which is entirely incorporated herein by reference.

BACKGROUND

Quantum computers typically make use of quantum-mechanical phenomena, such as superposition and entanglement, to perform operations on data. Quantum computers may be different from digital electronic computers based on transistors. For instance, whereas digital computers require data to be encoded into binary digits (bits), each of which is always in one of two definite states (0 or 1), quantum computation uses quantum bits (qubits), which can be in superpositions of states.

SUMMARY

Systems and methods disclosed herein relate to quantum information processing. The computational capability of a quantum computer is much more powerful than conventional digital computers. Quantum mechanics is now being used to construct a new generation of computers that can solve the most complex scientific problems—and unlock every digital vault in the world. Such quantum computers can perform a computation in a time period (e.g., seconds) that may be significantly less than a time period of a conventional computer to perform the computation. However, the cost of quantum information processing is extremely high. To make quantum computing more accessible to general populations, a new computational infrastructure integrating quantum computers and digital computers is necessary.

Access to quantum computing resources is expensive. Therefore, a new system disclosed herein allows shared access to quantum computing resources. A purpose of the system disclosed herein is to provide quantum computing services (e.g., optimization) on a cloud computing platform. The quantum computing services based on today's technologies have a potential to add additional functionalities as they are developed. Using a software development kit, users are not required to have a deep understanding of the internal architectures and mechanisms of quantum computing resources, implementation, or knowledge required for solving optimization problems using a quantum computer. The system disclosed herein may provide user interfaces for data analysis services on the cloud while taking advantage of quantum technology in a backend.

Systems and methods disclosed herein may be able to improve the quality of computing services with much greater capability, flexibility, and affordable costs. Scalable quantum computers disclosed herein may be complementary to digital computers wherein special-purpose computing resources are programmed or configured for certain classes of problems. Users in need of quantum computing services for their specific computing problems can access quantum-computing resources remotely, such as on the cloud. Users can run algorithms and experiments on quantum computers and processors working with individual quantum bits (qubits). Users may not be required to understand the internal architecture and mechanisms of quantum computing resources. Users' different familiarities with the issues and relevant solutions in their respective practices, such as, for example, weather forecasting, financial analysis, cryptography, logistical planning, search for Earth-like planets, and drug discovery, etc. may provide them a flexibility of accessing different quantum computing resources using methods and systems disclosed herein. Quantum computing services provided through the cloud can provide significantly faster service than digital computers.

Systems and methods provided herein may improve functionality of a quantum computer, such as, for example, by providing remote access to the quantum computer and facilitating the manner in which requests are processed. This can enable quantum computing to be scaled across multiple users at various locations.

The present disclosure provides methods and systems that enable ready access to a quantum computer. Such access may be remote access or local access. The quantum computer may be accessed over a network, such as through a cloud-based interface.

In one aspect, disclosed herein is a computing system for providing access to hybrid computing resources comprising a quantum computer and a classical computer, wherein the quantum computer and the classical computer are operatively coupled to a digital computer over a network, and wherein the digital computer comprises at least one computer processor and computer memory, the computing system comprising: (a) a gateway configured to receive a request from the digital computer over the network, wherein the request comprises a computational task; and (b) an arbiter configured to (i) receive the request from the gateway, (ii) decompose the computational task into one or more quantum computational tasks and one or more classical computational tasks, and (iii) distribute the one or more quantum computational tasks to the quantum computer and the one or more classical computational tasks to the classical computer.

In some embodiments, the arbiter is configured to (i) receive partial solutions from the quantum computer, from the classical computer, or both, (ii) integrate the partial solutions into a solution to the computational task, (iii) evaluate a completeness of the solution, and (iv) repeat decomposing and distributing a remaining portion of the computational task until the completeness of the solution is achieved. In some embodiments, the arbiter comprises an intelligent agent configured to (i) operate in a centralized or distributed classical processing environment and (ii) decompose and/or distribute the computational task in an intelligent manner. In some embodiments, the quantum computer is configured to perform one or more quantum algorithms to solve the one or more quantum computational tasks, and wherein the classical computer is configured to perform one or more classical algorithms to solve the one or more classical computational tasks. In some embodiments, the gateway comprises an application programmatic interface (API) configured to allow a client to transmit computational tasks and receive computational solutions.

In another aspect, disclosed herein is a method for providing access to hybrid computing resources comprising a quantum computer and a classical computer, wherein the quantum computer and the classical computer are operatively coupled to a digital computer over a network and wherein the digital computer comprises at least one computer processor and computer memory, the method comprising: (a) receiving a request from the digital computer over the network, wherein the request comprises a computational task; (b) receiving the request from a gateway; (c) decomposing the computational task into one or more quantum computational tasks and one or more classical computational tasks; and (d) distributing the one or more quantum computational tasks to the quantum computer and the one or more classical computational tasks to the classical computer.

In some embodiments, the method further comprises (i) receiving partial solutions from the quantum computer, from the classical computer, or both, (ii) integrating the partial solutions into a solution to the computational task, (iii) evaluating a completeness of the solution, and (iv) repeating decomposing and distributing a remaining portion of the computational task until the completeness of the solution is achieved. In some embodiments, the method further comprises using an intelligent agent to (i) operate in a centralized or distributed classical processing environment and (ii) decompose and/or distribute the computational task in an intelligent manner. In some embodiments, the quantum computer performs one or more quantum algorithms to solve the one or more quantum computational tasks, and wherein the classical computer performs one or more classical algorithms to solve the one or more classical computational tasks. In some embodiments, an application programmatic interface (API) is used to allow a client to transmit computational tasks and receive computational solutions.

In another aspect, disclosed herein is a computing system for providing a user of a digital computer remote access to a computing platform comprising at least one non-classical computer over a network, wherein the digital computer comprises at least one computer processor and computer memory comprising a computer program executable by the at least one computer processor to generate a request, and wherein the computing platform comprising the at least one non-classical computer is configured to execute one or more instructions in response to the request to generate one or more solutions, the computing system comprising: a communications interface configured to receive the request from the digital computer over the network; a cluster manager configured to (i) in response to the request, provide the one or more instructions for delivery to the computing platform comprising the at least one non-classical computer, which computing platform comprising the at least one non-classical computer is configured to execute the one or more instructions to generate the one or more solutions, and (ii) receive the one or more solutions generated by the computing platform comprising the at least one non-classical computer; and memory configured to store the one or more solutions generated by the computing platform comprising the at least one non-classical computer.

In some embodiments, the cluster manager is configured to control a start of termination of the one or more instructions, or to monitor a lifetime of the one or more instructions. In some embodiments, the cluster manager is configured to (i) place the request in a queue and (ii) maintain an order of the request in the queue. In some embodiments, the computing system further comprises an application programming interface (API) that is usable for different architectures of the computing platform comprising the at least one non-classical computer, wherein the API is configured to hide architectural or technological details of the computing platform comprising the at least one non-classical computer.

In some embodiments, the at least one non-classical computer comprises a quantum-ready computer or a quantum-enabled computer, and wherein the one or more instructions comprise a quantum algorithm. In some embodiments, the communications interface is configured to provide the one or more solutions generated by the computing platform comprising the at least one non-classical computer to the digital computer. In some embodiments, the one or more instructions comprise a plurality of instructions, wherein the one or more solutions comprise a plurality of solutions, and wherein the cluster manager is configured to provide the plurality of instructions for delivery to the computing platform comprising the plurality of non-classical computers, which computing platform comprising the plurality of non-classical computers is configured to execute the plurality of instructions to generate the plurality of solutions. In some embodiments, the computing system further comprises a transactional unit configured to receive an item of value in exchange for executing the one or more instructions to generate the one or more solutions. In some embodiments, the transactional unit determines a cost for executing the one or more instructions to generate the one or more solutions, wherein the transactional unit determines the cost before or after executing the one or more instructions, and wherein the one or more instructions are executed upon receiving authorization to execute the one or more instructions. In some embodiments, the authorization is received from the user of the digital computer, and wherein the item of value is equal to the cost.

In another aspect, disclosed herein is a computer-implemented method for providing a user of a digital computer remote access to a computing platform comprising at least one non-classical computer over a network, wherein the digital computer comprises at least one computer processor and computer memory comprising a computer program executable by the at least one computer processor to generate a request, and wherein the computing platform comprising the at least one non-classical computer is configured to execute one or more instructions in response to the request to generate one or more solutions, the method comprising: using a communications interface to receive the request from the digital computer over the network; in response to the request, providing the one or more instructions for delivery to the computing platform comprising the at least one non-classical computer, which computing platform comprising the at least one non-classical computer executes the one or more instructions to generate the one or more solutions; receiving the one or more solutions generated by the computing platform comprising the at least one non-classical computer; and storing the one or more solutions generated by the computing platform comprising the at least one non-classical computer in memory.

In some embodiments, the method further comprises controlling a start or termination of the one or more instructions, or monitoring a lifetime of the one or more instructions. In some embodiments, the method further comprises (i) placing the request in a queue and (ii) maintaining an order of the request in the queue. In some embodiments, the method further comprises using an application programming interface (API) that is usable for different architectures of the computing platform comprising the at least one non-classical computer, wherein the API hides architectural or technological details of the computing platform comprising the at least one non-classical computer. In some embodiments, the at least one non-classical computer comprises a quantum-ready computer or a quantum-enabled computer, and wherein the one or more instructions comprise a quantum algorithm. In some embodiments, the method further comprises providing the one or more solutions generated by the computing platform comprising the at least one non-classical computer to the digital computer. In some embodiments, the one or more instructions comprise a plurality of instructions, wherein the one or more solutions comprise a plurality of solutions, and wherein the method provides the plurality of instructions for delivery to the computing platform comprising the plurality of non-classical computers, which computing platform comprising the plurality of non-classical computers executes the plurality of instructions to generate the plurality of solutions. In some embodiments, the method further comprises receiving an item of value in exchange for executing the one or more instructions to generate the one or more solutions. In some embodiments, the method further comprises determining a cost for executing the one or more instructions to generate the one or more solutions after or prior to executing the one or more instructions, wherein the one or more instructions are executed upon receiving authorization to execute the one or more instructions. In some embodiments, the authorization is received from the user of the digital computer, and wherein the item of value is equal to the cost.

Another aspect of the present disclosure provides a non-transitory computer readable medium comprising machine-executable code that, upon execution by one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
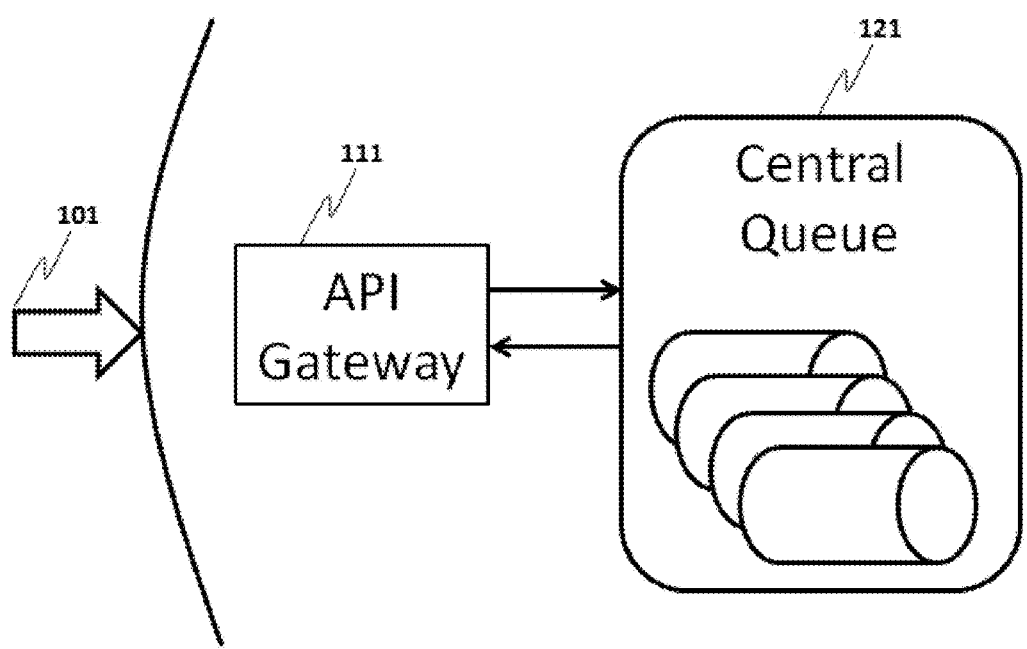
FIG. 1 shows a non-limiting example of an Application Program Interface (API) gateway and a queuing unit.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Quantum computing resources may be rare. Access to quantum computing resources may be expensive or such quantum computing resources may be inaccessible given geographic limitations. Even though a user may have direct access to a quantum computer, the user may be required to possess sophisticated expertise to configure the quantum computer and/or choose an adequate quantum algorithm for solving a computational task; otherwise, the user does not gain the benefit from the speedy computations offered by the quantum computer. Even a superior quantum computer may not exhibit any advantage over classical computing resources in solving a problem if the right algorithm, the right problem, and the right parameters are not chosen. On the other hand, from a user's perspective, a computational problem may be a very large computational task involving many smaller sub-tasks. Each of these sub-tasks may possess a different complexity characteristic. Therefore, using the right computing resource, the right algorithm, and the right parameter may be essential to solve the original problem efficiently and/or benefit from the potential quantum speedup.

The present disclosure provides systems and methods that offer quantum-ready services and/or quantum-enabled services. Quantum-ready services may advantageously make it easier for a user to manage quantum resources and switch between a classical or quantum computation resource. Additionally, a quantum-enabled framework may allow users to use both classical and quantum resources in a hybrid manner such that the framework intelligently chooses the right solver and the right parameters for each particular sub-problem or subtask.

The present disclosure provides systems and methods that may allow shared or distributed access to quantum computing resources (e.g., a quantum-ready or quantum-enabled services). The disclosed system may provide quantum computing services (e.g., optimization based on quantum algorithms) on a cloud computing platform. Using a software development kit (SDK), users may not be required to have a deep understanding of the quantum computing resources, implementation, or the knowledge required for solving optimization problems using a quantum computer. For example, use of an SDK to provide a user with shared or distributed access to quantum computing resources is disclosed in PCT International Application PCT/CA2017/050320, "Methods and Systems for Quantum Computing," which is entirely incorporated herein by reference.

The present disclosure provides systems and methods for facilitating quantum computing in a distributed environment, such as over a network (e.g., in the cloud). For example, a user at a first location may submit a request for a calculation or task to be performed by a quantum computer (e.g., an adiabatic quantum computer) at a second location that is remotely located with respect to the first location. The request may be directed over a network to one or more computer servers, which subsequently direct a request to the quantum computer to perform the calculation or task.

Provided herein are systems and methods that provide optimization services in a distributed computing environment (e.g., the cloud), which may utilize quantum computing technology, such as an adiabatic quantum computer. Methods and systems of the present disclosure enable quantum computing to be relatively and readily scaled across various types of quantum computers and users in various locations, in some cases without a need for users to have a deep understanding of the resources, implementation, or the knowledge required for solving optimization problems using a quantum computer. Systems provided herein may include user interfaces that enable users to perform data analysis in a distributed computing environment (e.g., in the cloud) while taking advantage of quantum technology in the back-end.

In some embodiments, systems, media, networks, and methods include a quantum computer, or use of the same. Quantum computation uses quantum bits (qubits), which can be in superpositions of states. A quantum Turing machine is a theoretical model of such a computer, and is also known as a universal quantum computer. Quantum computers share theoretical similarities with non-deterministic and probabilistic computers.

In some embodiments, a quantum computer comprises one or more quantum processors. A quantum computer may be configured to perform one or more quantum algorithms. A quantum computer may store or process data represented by quantum bits (qubits). A quantum computer may be able to solve certain problems much more quickly than any classical computers that use even the best currently available algorithms, like integer factorization using Shor's algorithm or the simulation of quantum many-body systems. There exist quantum algorithms, such as Simon's algorithm, that run faster than any possible probabilistic classical algorithm. Examples of quantum algorithms include, but are not limited to, quantum optimization algorithms, quantum Fourier transforms, amplitude amplifications, quantum walk algorithms, and quantum evolution algorithms. Quantum computers may be able to efficiently solve problems that no classical computer may be able to solve within a reasonable amount of time. Thus, a system disclosed herein utilizes the merits of quantum computing resources to solve complex problems.

Any type of quantum computers may be suitable for the technologies disclosed herein. Examples of quantum computers include, but are not limited to, adiabatic quantum computers, quantum gate arrays, one-way quantum computer, topological quantum computers, quantum Turing machines, superconductor-based quantum computers, trapped ion quantum computers, optical lattices, quantum dot computers, spin-based quantum computers, spatial-based quantum computers, Loss-DiVincenzo quantum computers, nuclear magnetic resonance (NMR) based quantum computers, liquid-NMR quantum computers, solid state NMR Kane quantum computers, electrons-on-helium quantum computers, cavity-quantum-electrodynamics based quantum computers, molecular magnet quantum computers, fullerene-based quantum computers, linear optical quantum computers, diamond-based quantum computers, Bose-Einstein condensate-based quantum computers, transistor-based quantum computers, and rare-earth-metal-ion-doped inorganic crystal based quantum computers. A quantum computer may comprise one or more of: a quantum annealer, an Ising solver, an optical parametric oscillator (OPO), or a gate model of quantum computing.

A system of the present disclosure may include or employ quantum-ready or quantum-enabled computing systems. A quantum-ready computing system may comprise a digital computer operatively coupled to a quantum computer. The quantum computer may be configured to perform one or more quantum algorithms. A quantum-enabled computing system may comprise a quantum computer and a classical computer, the quantum computer and the classical computer operatively coupled to a digital computer. The quantum computer may be configured to perform one or more quantum algorithms for solving a computational problem. The classical computer may comprise at least one classical processor and computer memory, and may be configured to perform one or more classical algorithms for solving a computational problem.

The term "quantum annealer" and like terms generally refer to a system of superconducting qubits that carries optimization of a configuration of spins in an Ising spin model using quantum annealing, as described, for example, in Farhi, E. et al., "Quantum Adiabatic Evolution Algorithms versus Simulated Annealing" arXiv.org: quant ph/0201031 (2002), pp. 1-16. An embodiment of such an analog processor is disclosed by McGeoch, Catherine C. and Cong Wang, (2013), "Experimental Evaluation of an Adiabatic Quantum System for Combinatorial Optimization" Computing Frontiers," May 14-16, 2013 (http://www.cs.amherst.edu/ccm/cf14-mcgeoch.pdf) and also disclosed in U.S. Patent Application Publication Number US 2006/0225165.

In some embodiments, a classical computer may be configured to perform one or more classical algorithms. A classical algorithm (or classical computational task) may be an algorithm (or computational task) that is able to be executed by one or more classical computers without the use of a quantum computer, a quantum-ready computing service, or a quantum-enabled computing service. A classical algorithm may be a non-quantum algorithm. A classical computer may be a computer which does not comprise a quantum computer, a quantum-ready computing service, or a quantum-enabled computer. A classical computer may process or store data represented by digital bits (e.g., zeroes ("0") and ones ("1")) rather than quantum bits (qubits). Examples of classical computers include, but are not limited to, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles.

In an aspect, the present disclosure provides a system for quantum-ready optimization. The computing system may comprise a digital computer operatively coupled to a remote quantum computer over a network. The quantum computer may be configured to perform one or more quantum algorithms. The digital computer may comprise at least one computer processor and computer memory. The computer memory may include a computer program with instructions executable by the at least one computer processor to render an application. The application may facilitate use of the quantum computer by a user.

In another aspect, the present disclosure provides a system for quantum-enabled optimization. The computing system may comprise a quantum computer and a classical computer, the quantum computer and the classical computer operatively coupled to a digital computer over a network. The quantum computer may be configured to perform one or more quantum algorithms for solving a computational problem. The classical computer may comprise at least one classical processor and computer memory, and may be configured to perform one or more classical algorithms for solving a computational problem. The digital computer may comprise at least one computer processor and computer memory, wherein the digital computer may include a computer program with instructions executable by the at least one computer processor to render an application. The application may facilitate use of the quantum computer and/or the classical computer by a user.

Some implementations may use quantum computers along with classical computers operating on bits, such as personal desktops, laptops, supercomputers, distributed computing, clusters, cloud-based computing resources, smartphones, or tablets.

The system may include a gateway programmed or configured to receive a request over the network. The request may comprise a computational task. Examples of a computational task include, but are not limited to, search, optimization, statistical analysis, modeling, data processing, etc. In some embodiments, a request may comprise a dataset; for example, a data matrix including variables and observations for creating a modeling or analyzing statistics of the data set. Further, a solution may be derived; for example, an optimal model underlying a given dataset is derived from a quantum computer; a statistical analysis is performed by a quantum computer.

The system may comprise a queuing unit programmed or configured to store and order the request in one or more queues. The system may comprise a cluster manager programmed or configured to create an instance/container (also "worker" herein) to (1) translate the request in the queue into one or more quantum machine instructions, (2) deliver the one or more quantum machine instructions to the quantum computer over the network to perform the computational task, and (3) receive one or more solutions from the quantum computer. The one or more solutions may be stored in a database of the system. The system may comprise a logging unit programmed or configured to log an event of the worker.

The system may comprise an interface for a user. In some embodiments, the interface may comprise an application programming interface (API). The interface may provide a programmatic model that abstracts away (e.g., by hiding from the user) the internal details (e.g., architecture and operations) of the quantum computer. In some embodiments, the interface may minimize a need to update the application programs in response to changing quantum hardware. In some embodiments, the interface may remain unchanged when the quantum computer has a change in internal structure.

Gateway

Systems, media, networks, and methods of the present disclosure may comprise a gateway that may be programmed or configured to receive a request from a user. The request may comprise a computational task. In some embodiments, the gateway is programmed or configured to authenticate a user of the system. In some embodiments, the gateway is programmed or configured to monitor system and data security. As an example, a gateway may use secure sockets layer (SSL) for encrypting requests and responses. In some embodiments, a gateway is programmed or configured to route the request to one of the at least one digital processor. In some embodiments, a gateway is programmed or configured to monitor data traffic.

In some embodiments, the systems, media, networks, and methods comprise a queuing unit. In some embodiments, a queuing unit is programmed or configured to place the request in the queue. When a queue comprises more than one request, the more than one requests may be placed in order. The order may be based on first-in-first-out, or based on timing, or based on available quantum computing resources. In some embodiments, a queuing unit is further programmed or configured to reorder the request in the queue. In some embodiments, a queuing unit is responsible for preventing message loss. The tasks submitted may be stored in the queue and may be accessed in order by the microservices that need to work with them.

A gateway may be a microservice used for authentication, routing, security, and monitoring purposes. Referring to FIG. 1, a request 101 is received by an application programming interface (API) gateway 111 and then forwarded through to one or more target microservices. In some embodiments, when the target microservices are not available immediately, the request 101 may be first handled by a queuing unit 121 which places the request in a queue. In some cases, a request is pushed into the queue 121 or inserted into the queue 121. In some embodiments, a request in the queue 121 is reordered based on priorities of computational tasks. For instance, if a new incoming request has a same computational task as the request at the top of the queue, to save quantum computing resources, it may be better to have the new request being executed concurrently with the top queue, so the queuing unit places the new request at the top of the queue as well.

In some embodiments, the systems, media, networks, and methods described herein comprise a database service, or use of the same. In some embodiments, a database is programmed or configured to store a data set in the request. In some embodiments, a database in the microservices is in charge of storing persistent data. In some embodiments, solutions to solved problems are maintained by the database.

Figure 2:
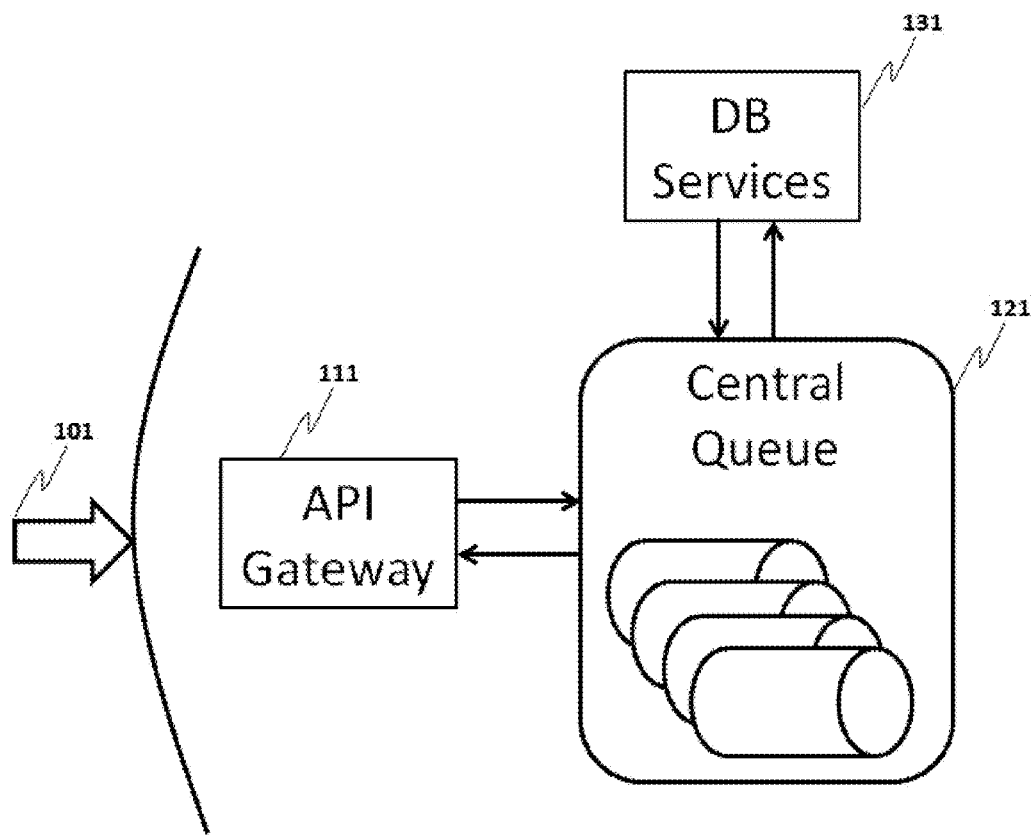
FIG. 2 shows a non-limiting example of an API gateway, a queuing unit, and a database service.

Referring to FIG. 2, a database 131 communicates with the queuing unit 121. In some embodiments, status of a worker or a quantum computing resource (e.g., availabilities, reading, writing, queuing, algorithms to be executed, algorithms having been performed, and timestamps) are stored in the database 131. In some embodiments, data sent along with a request are stored in the database 131 as well. Persistent data and solutions to solved tasks may be stored in the database 131.

In some embodiments, the quantum-ready system disclosed herein comprises one or more databases, or use of the same. Many types of databases may be suitable for storage and retrieval of application information. In some embodiments, suitable databases include, by way of non-limiting examples, relational databases, non-relational databases, object oriented databases, object databases, entity-relationship model databases, associative databases, and XML databases. In some embodiments, a database is internet-based. In some embodiments, a database is web-based. In some embodiments, a database is cloud computing-based (e.g., on the cloud). In other embodiments, a database is based on one or more local computer storage devices.

In some embodiments, a system may comprise a serialization unit configured to communicate problem instances from the user to the quantum computer through the gateway. On the other hand, the serialization unit may be programmed or configured to communicate computed solutions to those instances from the quantum computer back to the user through the gateway. The serialization mechanism may be based on JavaScript Object Notation (JSON), eXtensible Markup Language (XML), or other markup languages; however, an entirely new format for the serialization may be used. In some embodiments, the serialization mechanism may comprise transmitting texts or binary files. In some embodiments, the serialization mechanism may or may not be encrypted. In some embodiments, the serialization mechanism may or may not be compressed.

In some embodiments, a system may comprise a user interface configured to allow a user to submit a request to solve a computational task. A user may specify the task and submit associated datasets. The user interface may transmit the request and the datasets to the gateway. The gateway may then process the request based on the technologies disclosed herein. When solutions are derived by a quantum computer, the gateway may send a notification to the user. The user may retrieve the solutions via the user interface.

Cluster Manager

In some embodiments, the systems, media, networks, and methods described herein comprise a cluster manager. The cluster manager may be programmed or configured to translate the request into quantum machine instructions. In some embodiments, the cluster manager delivers the quantum machine instructions to a quantum processor to perform the computational task. In addition, the cluster manager receives one or more solutions from the quantum processor.

In some embodiments, a cluster manager is programmed to divide the computational task into two or more computational components. In some embodiments, a computational component corresponds to a quantum algorithm. In some embodiments, the two or more computational components are translated into one or more quantum algorithms, or translated into quantum machine instructions.

In some embodiments, translating into quantum machine instructions comprises determination of a number of qubits and/or determination of a quantum operator. In some embodiments, two or more computational components are executed by the quantum computer sequentially, in parallel, or both thereof.

In some embodiments, a cluster manager is programmed or configured to aggregate solutions of the two or more computational components. In some embodiments, a cluster manager is further programmed or configured to control a start and a termination of the computational task. Further, a cluster manager may be programmed or configured to monitor a lifetime of the computational task.

Figure 3:
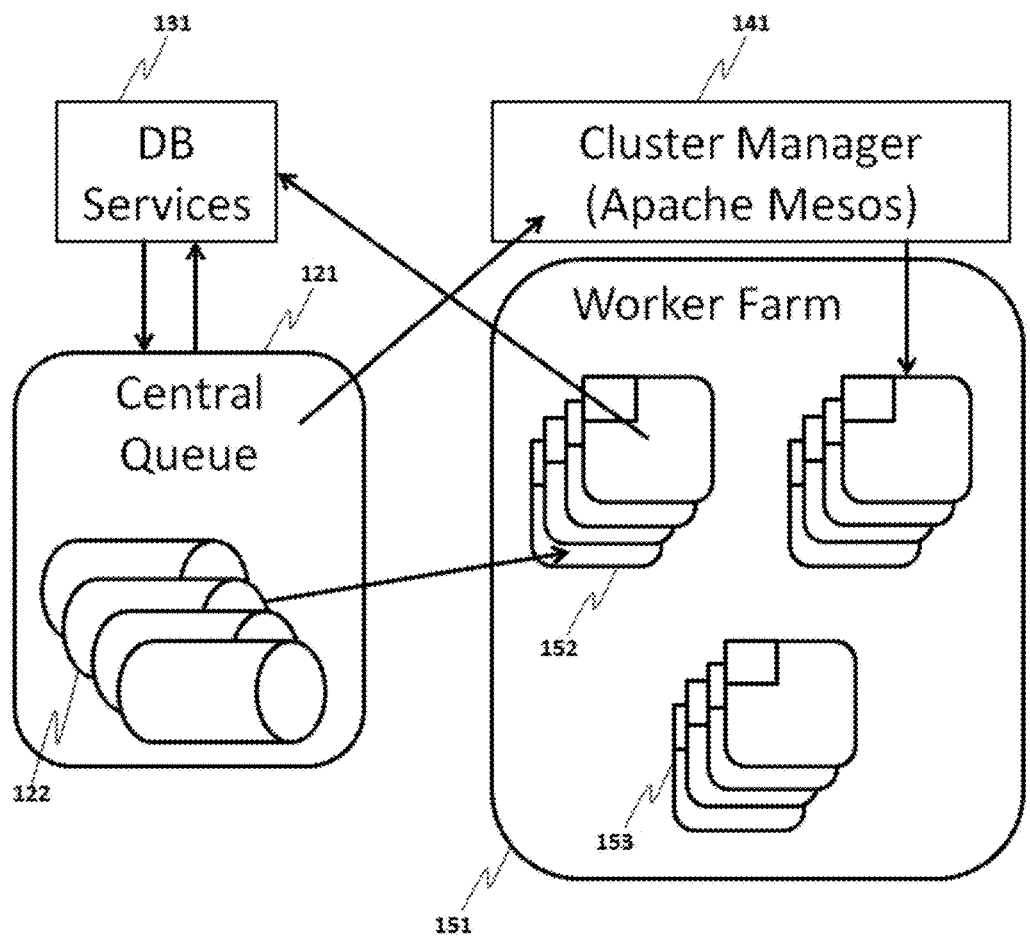
FIG. 3 shows a non-limiting example of a queuing unit, database service, and a cluster manager.

Referring to FIG. 3, the central queue 121 transmits the recent state of the queue to the cluster manager 141. In this example, the cluster manager 141 is realized by an Apache Mesos server. The cluster manager 141 starts and controls a lifetime of certain types of computational components. The cluster manager starts instances/containers (called workers) that are able to perform the operations (e.g., translating to specific quantum computing instructions, controlling quantum computers/processors 201 to execute computational tasks, etc.) required by the queue entries. For instance, a worker 152 is assigned to process a request 122. If the worker 152 is successful, it sends a result of the processing of the request to the database service 131 and removes the entry 122 from the queue. The worker 152 is then destroyed to free up resources for other operations in order to save costs.

In some embodiments, an algorithm specified in a request may comprise a classical or a quantum algorithm. A worker may determine if the classical algorithm or the quantum algorithm has to be translated into another classical algorithm or another quantum algorithm. Once a computational task in a request has been translated into quantum machine instructions, the quantum machine instructions may be transmitted to a quantum computer. The quantum computer may execute a classical algorithm or a quantum algorithm or both to complete a computational task.

Logging Unit

In some embodiments, the systems, media, networks, and methods described herein comprise a logging unit, or use of the same. In some embodiments, a logging service is in charge of tracking the events occurring in separate microservices. Some or all of the microservices may transmit a log of events into a central logging microservice.

An event disclosed herein may be associated with any one or more of the following: a login into the system, submitting a request, processing the request, queuing the request, processing a computational task in the request, dividing the computational task, translating the computational task into a quantum algorithm and quantum instructions, transmitting quantum instructions to a quantum computer, performing computations by a quantum computer, performing computational operations in a quantum computer, transmitting a computational result or a solution from a quantum computer to a server, and notifying a user of an availability of the results or solutions.

In some embodiments, a logging unit is programmed or configured to store a log, wherein the log comprises an event taking in the digital computer or the quantum processor. In some embodiments, a log comprises a timestamp of the event.

Figure 4:
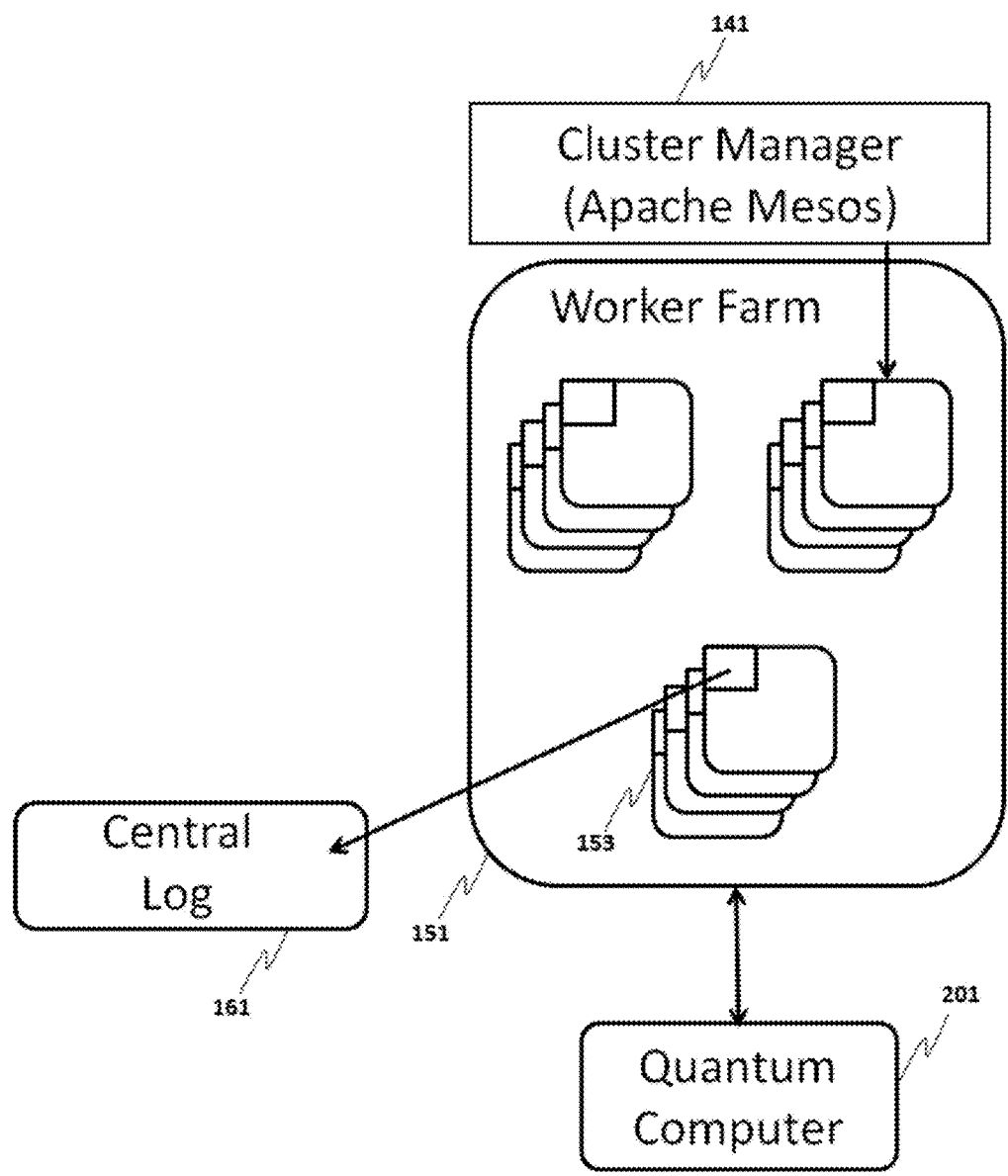
FIG. 4 shows a non-limiting example of a cluster manager and a logging unit.

Referring to FIG. 4, a logging unit 161 communicates with workers to record some or all of the events. In this figure, the logging unit 161 communicates with a worker 153 to record the start, the operations, and the end of computational tasks.

Quantum-Enabled and Quantum-Ready Computing

The present disclosure provides systems, media, networks, and methods that may include quantum-enabled computing or use of quantum-enabled computing. Quantum computers may be able to solve certain classes of computational tasks more efficiently than classical computers. However, quantum computation resources may be rare and expensive, and may involve a certain level of expertise to be used efficiently or effectively (e.g., cost-efficiently or cost-effectively). A number of parameters may be tuned in order for a quantum computer to deliver its potential computational power.

Quantum computers (or other types of non-classical computers) may be able to work alongside classical computers as co-processors. A hybrid architecture of quantum-enabled computation can be very efficient for addressing complex computational tasks, such as hard optimization problems. A system disclosed herein may provide a remote interface capable of solving computationally expensive problems by deciding if a problem may be solved efficiently on a quantum-ready or a classical computing service. The computing service behind the interface may be able to efficiently and intelligently decompose or break down the problem and delegate appropriate components of the computational task to a quantum-ready or a classical service.

The methods and systems described here may comprise an architecture configured to realize a cloud-based framework to provide hybrid quantum-enabled computing solutions to complex computational problems (such as complex discrete optimization) using a classical computer for some portion of the work and a quantum (or quantum-like) computer (e.g., quantum-ready or quantum-enabled) for the remaining portion of the work.

Figure 6:
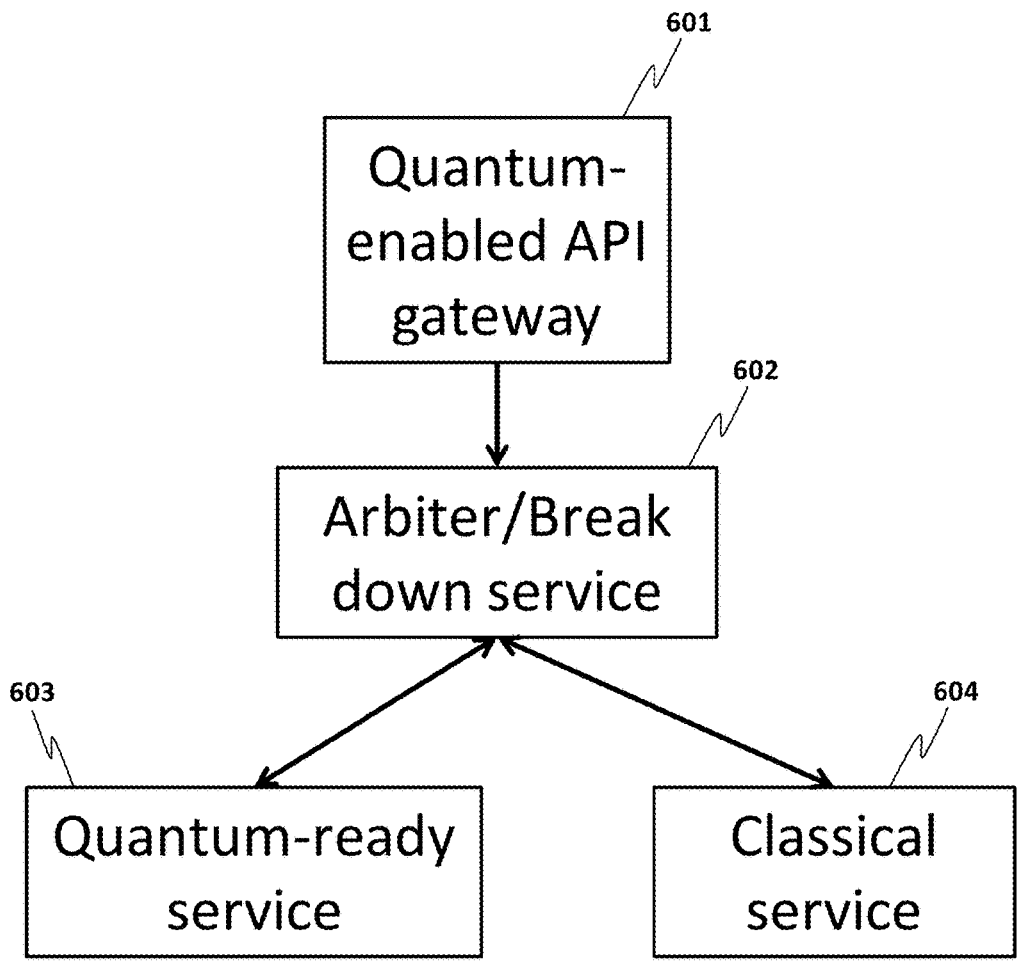
FIG. 6 shows a non-limiting example of a quantum-enabled computing platform.

FIG. 6 shows a workflow for performing a computational task using a quantum-ready (quantum ready) service. In a first operation, a user or a client may submit a computational task to an API gateway 601. The computational task may then be forwarded to an arbiter 602. In a second operation, the arbiter 602 may decompose and/or distribute the computational task to a quantum ready service 603 and a classical service 604. The computational task may thus be decomposed and/or distributed into sub-problems, each of which may be performed by a respective one of the quantum ready service 603 and the classical service 604. Next, one or more solutions from each of the quantum ready service 603 and the classical service 604 may be directed to the arbiter 602 (or another arbiter). Next, an indication of a solution to the computational task may be provided to the client or the user, such as being directed to a user interface of an electronic device of the client or the user (e.g., being directed over a network, such as over the cloud). The solution may comprise individual solutions to the sub-problems. The indication may include the solution or the individual solutions.

The technology disclosed herein may comprise a series of sub-processes that may involve intelligently decomposing a hard (e.g., complex) computational task into simpler (e.g., less complex) sub-problems. The system may further intelligently decide how to distribute the decomposed tasks between a plurality of classical computation resources and quantum-ready computation services.

Referring again to FIG. 6, the quantum-enabled API gateway 601 may comprise a user-facing service responsible for providing one or more of the following: Authentication, Monitoring (e.g., logging), and Bandwidth throttling. The user-facing service may comprise a programmatic access to a client computer. The authentication may check the identity of a user and determine if the access to the quantum-enabled resources should be granted.

Referring again to FIG. 6, the arbiter 602 may solve quantum problems and classical problems together. In some applications, the arbiter 602 may decompose a given problem using an intelligent algorithm. The arbiter 602 may comprise one or more intelligent algorithms operating in a centralized or distributed classical processing environment. The arbiter may provide a quantum-enabled software service by operating one or more of the following: (1) Breaking down (e.g., decomposing) a given problem into sub-problems; (2) Identifying the sub-problems that can be solved using a quantum-ready service 603; (3) Distributing tasks between the classical and quantum-ready services 603 and 604, respectively, accordingly; (4) Collecting solutions of the sub-problems from the classical and quantum-ready services 603 and 604, respectively; (5) Reducing the original computational tasks using the collected solutions to sub-problems; (6) If the original problem is completely solved, the system may provide an indication of the solution and terminate; otherwise, the system may repeat operation (1) for the remaining portion of the reduced problem. The operations of quantum-ready service 603 may be based on the technologies described elsewhere herein. On the other hand, classical service 604 may comprise any cloud-based software service configured to address processing of expensive computational tasks by obtaining an indication of such tasks from a client; applying required processes to transform the indication of such tasks to a proper form; and submitting the indication of such tasks to one or more classical digital computing devices, such as computers, clusters of computers, supercomputers, etc.

In various implementations, a computing system may include parallel or distributed computing. The quantum-ready service 603 and classical service 604 may operate in parallel. Further, parallel computing may be implemented in the quantum-ready service 603. For example, referring to FIG. 5, a quantum computer may solve multiple computational problems in parallel in the worker farm 151; a single problem or sub-problem may be solved in parallel in the worker farm 151. Similarly, a classical computer may solve multiple computational problems in parallel; a single problem or sub-problem may be further solved in a parallel or distributed manner.

Figure 7:
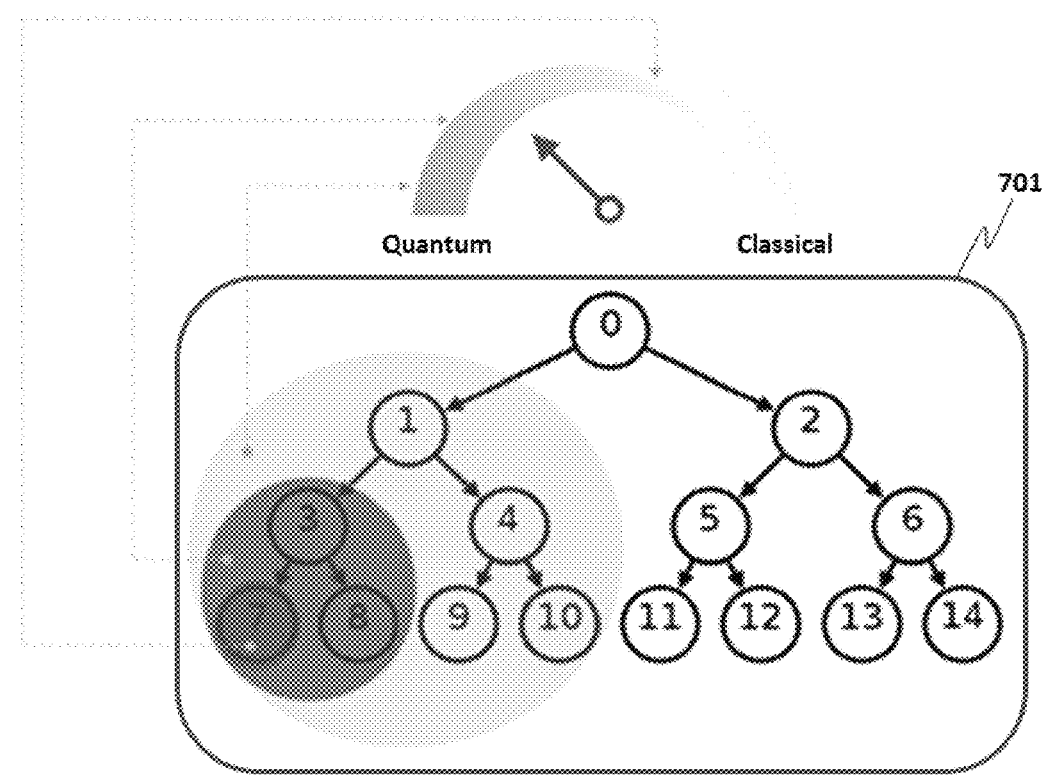
FIG. 7 shows a non-limiting example of an analysis tree for decomposing a given problem into sub-problems in quantum and classical computing resources.

Intelligent algorithms for decomposition and distribution may be dynamic and problem dependent. One or more such intelligent algorithms may be used. Referring to FIG. 7, intelligent algorithms may model a feasible solution space as a search tree 701. Each node of the tree may be used to decompose an original computing problem into corresponding sub-problems including disjoint or overlapping sets of variables. In tree 701, different nodes represent a sub-problem solver; for instance, nodes 0, 2, 5, 6, and 11-14 may be capable of solving classical tasks, while nodes 1, 3-4 and 7-10 may be capable of solving quantum tasks. Further, a capability of solving classical and quantum tasks may vary from node to node; for example, nodes 3 and 8 may be able to solve few classical tasks and many quantum tasks, while node 7 may be able to solve many classical tasks and few quantum tasks. The intelligent algorithms may compute certain characteristics of the potential sub-problems at a certain node in the search tree. Examples of characteristics may include, but are not limited to, adequacy in classical solvers, adequacy in quantum solvers, complexity (e.g., time and processor cycles) of computing tasks, current computing capacity in quantum and classical sources, and an estimated time of computed solutions. The characteristics may be deterministic or probabilistically modeled. The intelligent algorithms may have access to information about the size restrictions, capacity, and best-case performance modes of each of the available quantum and classical computing resources. The intelligent algorithms may use information available about the quantum and classical computing resources as well characteristics of potential sub-problems. The intelligent algorithms can determine whether it is advantageous to decompose the problem at a certain node of the search tree. If a decomposition takes place, the resulting sub-problems may be added to the pool of sub-problems together with their corresponding nodes in the search tree. If a decomposition is not advantageous, the intelligent algorithms may continue traversing the search tree considering all the possible nodes, until a certain decomposition is advantageous. Based on partial results of sub-problems received from the quantum or classical computing resources, the intelligent algorithms may be able to reduce the search tree by pruning certain nodes which may not contribute to a better solution.

Although the present disclosure has made reference to quantum computers, methods and systems of the present disclosure may be employed for use with other types of computers, which may be non-classical computers. Such non-classical computers may comprise quantum computers, hybrid quantum computers, quantum-type computers, or other computers that are not classical computers. Examples of non-classical computers may include, but are not limited to, Hitachi Ising solvers, coherent Ising machines based on optical parameters, and other solvers which utilize different physical phenomena to obtain more efficiency in solving particular classes of problems.

Transactions

In various embodiments, the systems, methods, platforms, and media described herein may comprise a transactional unit for receiving an item of value in exchange for at least executing the one or more instructions to generate the one or more solutions. The item of value may comprise money or credit. The item of value may be received from a user of the digital computer. The transactional unit may determine a cost for executing the one or more instructions to generate the one or more solutions. The transactional unit may determine the cost after or prior to executing the one or more instructions, and wherein the one or more instructions may be executed upon receiving authorization to execute the one or more instructions. The authorization may be received from a user of the digital computer. The item of value may be equal to the cost.

Digital Processing Device

In some embodiments, the systems, media, networks, and methods described herein comprise digital processing device, or use of the same. In some embodiments, the digital processing device includes one or more hardware central processing units (CPUs) that carry out the device's functions. In some embodiments, the digital processing device further comprises an operating system (OS) configured to perform executable instructions. In some embodiments, the digital processing device is connected a computer network. In some embodiments, the digital processing device is connected to the Internet such that it accesses the World Wide Web. In some embodiments, the digital processing device is connected to a cloud computing infrastructure. In some embodiments, the digital processing device is connected to an intranet. In some embodiments, the digital processing device is connected to a data storage device.

In accordance with the description herein, suitable digital processing devices may include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Smartphones may be suitable for use with methods and systems described herein. Select televisions, video players, and digital music players, in some cases with computer network connectivity, may be suitable for use in the system described herein. Suitable tablet computers may include those with booklet, slate, and convertible configurations.

In some embodiments, the digital processing device includes an operating system configured to perform executable instructions. The operating system is, for example, software, including programs and data, which manages the device's hardware and provides services for execution of applications. Suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Suitable media streaming device operating systems include, by way of non-limiting examples, Apple TV®, Roku®, Boxee®, Google TV®, Google Chromecast®, Amazon Fire®, and Samsung® HomeSync®. Suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In some embodiments, on OLED display is a passive-matrix OLED (PMOLED) or active-matrix OLED (AMOLED) display. In some embodiments, the display is a plasma display. In other embodiments, the display is a video projector. In some embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In some embodiments, the input device is a Kinect, Leap Motion, or the like. In some embodiments, the input device is a combination of devices such as those disclosed herein.

Non-Transitory Computer Readable Storage Medium

In some embodiments, the systems, media, networks and methods described herein include one or more non-transitory computer readable storage media encoded with a program including instructions executable by the operating system of an optionally networked digital processing device. In some embodiments, a computer readable storage medium is a tangible component of a digital processing device. In some embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, media, networks and methods described herein include at least one computer program, or use of the same. A computer program includes a sequence of instructions, executable in the digital processing device's CPU, written to perform a specified task. Computer readable instructions may be implemented as program units, such as functions, objects, Application Programming Interfaces (APIs), data structures, and the like, that perform particular tasks or implement particular data types (e.g., abstract data types). In light of the disclosure provided herein, a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In some embodiments, a computer program includes one or more software units. In some embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. A web application may utilize one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In some embodiments, suitable relational database systems include, by way of non-limiting examples, Microsoft® SQL Server, mySQL™, and Oracle®. A web application may be written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In some embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

A mobile application may be created, for example, using hardware, languages, and development environments. Mobile applications may be written in various programming languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Several commercial forums may be available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Standalone applications may be compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins may enable customizing the functionality of a software application. For example, plug-ins are commonly used in web browsers to play video, generate interactivity, scan for viruses, and display particular file types. Web browser plug-ins include, without limitation, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

Several plug-in frameworks are available that may enable development of plug-ins in various programming languages, including, by way of non-limiting examples, C++, Delphi, Java™, PHP, Python™, and VB .NET, or combinations thereof.

Web browsers (also called Internet browsers) are software applications, which may be configured for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) may be configured for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the systems, media, networks and methods described herein include software, server, and/or database modules, or use of the same. Software modules may be created using various machines, software, and programming languages. The software modules disclosed herein are implemented in a multitude of ways. In some embodiments, a software module comprises a file, a section of code, a programming object, a programming structure, or combinations thereof. In some embodiments, a software module comprises a plurality of files, a plurality of sections of code, a plurality of programming objects, a plurality of programming structures, or combinations thereof. In some embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In some embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting.

Example 1—Computing Architecture

Figure 5:
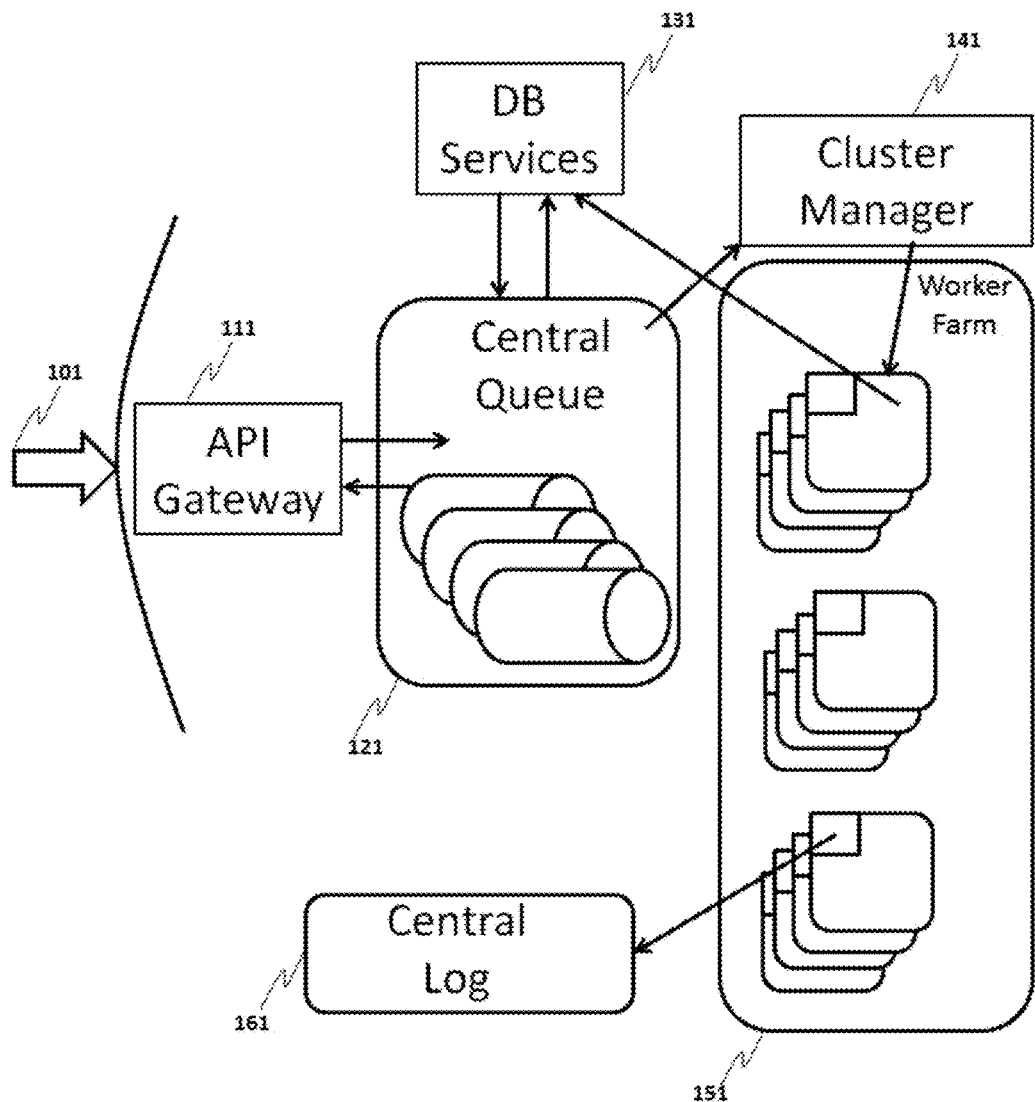
FIG. 5 shows a non-limiting example of a computing architecture of a cloud platform for accessing shared quantum computing resources.

FIG. 5 shows a non-limiting example of a computing architecture of the system. A request 101 comprising computational tasks is transmitted to an API gateway 111. The request 101 is first handled by a queuing unit 121 which places the request in a queue. A database 131 communicates with the queuing unit 121 to record status and transactions of queues. The queuing unit 121 further transmits the recent state of the queue to the cluster manager 141. In this example, the cluster manager 141 is realized by an Apache Mesos server. The cluster manager 141 starts and controls a lifetime of certain types of computational components. The cluster manager 141 starts workers in worker farm 151 to perform integrated digital and quantum computations, such as translating into specific quantum computing instructions and controlling digital and quantum processors to execute computational tasks. A worker completing its assigned tasks is then destroyed by the cluster manager 141. A logging unit 161 communicates with workers to record all the events.

Systems and methods of the present disclosure may be combined with or modified by other systems and methods, such as, for example, those described in U.S. Patent Pub. No. 2012/0326720 and U.S. Patent Pub. No. 2006/0225165; Farhi, Edward, et al. "Quantum computation by adiabatic evolution." arXiv preprint quant-ph/0001106 (2000); and Van Dam, Wim, Michele Mosca, and Umesh Vazirani, "How powerful is adiabatic quantum computation?", Foundations of Computer Science, 2001, Proceedings, 42nd IEEE Symposium on IEEE (2001), each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computing system for providing a user of a digital computer remote access to a computing platform comprising at least one non-classical computer over a network, wherein the digital computer comprises at least one computer processor and computer memory comprising a computer program executable by the at least one computer processor to generate a request comprising a computational task, and wherein the computing platform comprising the at least one non-classical computer is configured to execute one or more instructions in response to the request to generate one or more solutions, the computing system comprising:
 a communications interface configured to receive the request from the digital computer over the network;
 a cluster manager configured to (i) in response to receiving the request, translate the request into the one or more instructions comprising one or more non-classical machine instructions and a non-classical algorithm selected from a plurality of algorithms for solving the computational task, wherein the non-classical algorithm is selected without any involvement from the user, (ii) provide the one or more instructions for delivery to the computing platform comprising the at least one non-classical computer, which computing platform comprising the at least one non-classical computer is configured to execute the one or more instructions to generate the one or more solutions, and (iii) receive the one or more solutions generated by the computing platform comprising the at least one non-classical computer; and
 memory configured to store the one or more solutions generated by the computing platform comprising the at least one non-classical computer.

2. The computing system of claim 1, wherein the cluster manager is configured to control a start or termination of the one or more instructions, or to monitor a lifetime of the one or more instructions.

3. The computing system of claim 1, wherein the cluster manager is configured to (i) place the request in a queue and (ii) maintain an order of the request in the queue.

4. The computing system of claim 1, further comprising an application programming interface (API) that is usable for different architectures of the computing platform comprising the at least one non-classical computer, wherein the API is configured to hide architectural or technological details of the computing platform comprising the at least one non-classical computer.

5. The computing system of claim 1, wherein the at least one non-classical computer comprises a quantum-ready computer or a quantum-enabled computer, and wherein the one or more instructions comprise a quantum algorithm.

6. The computing system of claim 1, wherein the communications interface is configured to provide the one or more solutions generated by the computing platform comprising the at least one non-classical computer to the digital computer.

7. The computing system of claim 1, wherein the one or more instructions comprise a plurality of instructions, wherein the one or more solutions comprise a plurality of solutions, wherein the one or more non-classical computers comprise a plurality of non-classical of computers, and wherein the cluster manager is configured to provide the plurality of instructions for delivery to the computing platform comprising the plurality of non-classical computers, which computing platform comprising the plurality of non-classical computers is configured to execute the plurality of instructions to generate the plurality of solutions.

8. The computing system of claim 1, further comprising a transactional unit configured to receive an item of value in exchange for executing the one or more instructions to generate the one or more solutions.

9. The computing system of claim 8, wherein the transactional unit determines a cost for executing the one or more instructions to generate the one or more solutions, wherein the transactional unit determines the cost before or after executing the one or more instructions, and wherein the one or more instructions are executed upon receiving authorization to execute the one or more instructions.

10. The computing system of claim 9, wherein the authorization is received from the user of the digital computer, and wherein the item of value is equal to the cost.

11. The computing system of claim 1, wherein the non-classical algorithm comprises a quantum algorithm.

12. A computer-implemented method for providing a user of a digital computer remote access to a computing platform comprising at least one non-classical computer over a network, wherein the digital computer comprises at least one computer processor and computer memory comprising a computer program executable by the at least one computer processor to generate a request comprising a computational task, and wherein the computing platform comprising the at least one non-classical computer is configured to execute one or more instructions in response to the request to generate one or more solutions, the method comprising:
 (a) using a communications interface to receive the request from the digital computer over the network;
 (b) in response to receiving the request, (i) translating the request into instructions comprising one or more non-classical machine instructions and a non-classical algorithm selected from a plurality of algorithms for solving the computational task, wherein the non-classical algorithm is selected without any involvement from the user, and (ii) providing the one or more instructions for delivery to the computing platform comprising the at least one non-classical computer, which computing platform comprising the at least one non-classical computer executes the one or more instructions to generate the one or more solutions;
 (c) receiving the one or more solutions generated by the computing platform comprising the at least one non-classical computer; and
 (d) storing the one or more solutions generated by the computing platform comprising the at least one non-classical computer in memory.

13. The method of claim 12, further comprising controlling a start or termination of the one or more instructions, or monitoring a lifetime of the one or more instructions.

14. The method of claim 12, further comprising (i) placing the request in a queue and (ii) maintaining an order of the request in the queue.

15. The method of claim 12, further comprising using an application programming interface (API) that is usable for different architectures of the computing platform comprising the at least one non-classical computer, wherein the API hides architectural or technological details of the computing platform comprising the at least one non-classical computer.

16. The method of claim 12, wherein the at least one non-classical computer comprises a quantum-ready computer or a quantum-enabled computer, and wherein the one or more instructions comprise a quantum algorithm.

17. The method of claim 12, further comprising providing the one or more solutions generated by the computing platform comprising the at least one non-classical computer to the digital computer.

18. The method of claim 12, wherein the one or more instructions comprise a plurality of instructions, wherein the one or more solutions comprise a plurality of solutions, wherein the one or more non-classical computers comprise a plurality of non-classical of computers, and wherein the method provides the plurality of instructions for delivery to the computing platform comprising the plurality of non-classical computers, which computing platform comprising the plurality of non-classical computers executes the plurality of instructions to generate the plurality of solutions.

19. The method of claim 12, further comprising receiving an item of value in exchange for executing the one or more instructions to generate the one or more solutions.

20. The method of claim 19, further comprising determining a cost for executing the one or more instructions to generate the one or more solutions after or prior to executing the one or more instructions, wherein the one or more instructions are executed upon receiving authorization to execute the one or more instructions.

21. The method of claim 20, wherein the authorization is received from the user of the digital computer, and wherein the item of value is equal to the cost.

22. The method of claim 12, wherein the non-classical algorithm comprises a quantum algorithm.

* * * * *